United States Patent [19]
Konrad

[11] 3,868,554
[45] Feb. 25, 1975

[54] CURRENT LIMIT SYSTEM FOR DC MOTOR CONTROL

[75] Inventor: Charles Edward Konrad, Roanoke, Va.

[73] Assignee: General Electric Company, Salem, Va.

[22] Filed: Dec. 26, 1973

[21] Appl. No.: 428,022

[52] U.S. Cl. ............... 318/434, 318/334, 318/345, 318/472
[51] Int. Cl. ............................................. H02p 5/00
[58] Field of Search ........... 318/345, 334, 317, 472, 318/434

[56] References Cited
UNITED STATES PATENTS

| | | | |
|---|---|---|---|
| 3,388,307 | 6/1968 | Prapis et al. | 318/434 |
| 3,569,810 | 3/1971 | Thiele | 318/434 X |
| 3,582,746 | 7/1974 | Nye, Jr. | 318/434 X |
| 3,624,837 | 11/1971 | Albarda | 318/434 X |

*Primary Examiner*—B. Dobeck
*Attorney, Agent, or Firm*—W. C. Bernkopf; J. H. Beusse

[57] ABSTRACT

A current limit system for a DC motor control of the switching regulator or pulse control type which factors in both the mark-space ratio of the control, and the actual current through the motor. The maximum allowable motor current is thus controlled as a function of the mark-space ratio of a thyristor coupling the motor to a source of electrical energy. In a preferred embodiment, the maximum allowable current is also varied as a function of thyristor temperature, and an absolute maximum value is established for motor current, which does not vary with operating parameters.

10 Claims, 2 Drawing Figures

CURRENT LIMIT SYSTEM FOR DC MOTOR CONTROL

BACKGROUND OF THE INVENTION

The present invention relates generally to DC motor controls of the pulse control type and, more particularly, to improved means for limiting current flow in a system.

Means to control the power applied to a DC motor by a DC source have long been known, and several workable approaches have been implemented. The last decade, however, has seen the development of vastly improved DC motor controls of the so-called pulse control variety. with the pulse control approach a solid-state device such as a thyristor is interposed between a DC motor and a source of electrical energy, and the device rapidly switched from a conductive to a nonconductive state. The percentage of time of conduction of the switching device, also called the mark-space ratio, thus determines the percent of the source voltage which appears across the terminals of the motor. Ordinarily, pulse control has been provided in one of two ways; by switching the thyristor on for a fixed period of time, and varying the frequency at which the fixed on-times appear; or by energizing the thyristor at a fixed frequency but varying the on time thereof. The former approach is termed frequency regulation; while the latter is referred to as pulse width regulation. With any approach, however, it is the time-averaged percentage of conductivity which determines the average power applied to the motor.

The most successful switching device used to date for pulse control systems is the silicon controlled rectifier, or SCR. It has long been recognized that such a device may be destroyed by allowing the passage of inordinately high current through the thyristor. The current-carrying ability of the thyristor, however, varies markedly with the temperature thereof. Because of this, many schemes have been devised for monitoring the temperature of thyristors and for regulating the current carried by the circuit as a function of detected cell temperature. Most commercial embodiments have comprised means for setting a maximum current level, which maximum level is varied as a function of sensed thyristor temperature. Other systems have been devised which limit current flow by factoring in both current and temperature. Such an approach, however, has the deficiency of being unable to discriminate between current flow constituted by short pulses of relatively high current, and long pulses of lower current. This approach is not totally satisfactory as it ignores the fact that the actual heating of the thyristor is not only a function of maximum time-averaged current, but depends at least in part upon the peak value of current, and the duration of the intervals of conductivity of the thyristor.

Other approaches have been suggested which vary the maximum allowable thyristor current with either RMS current, or average current. However, as the equivalent circuit for a typical thyristor more closely approximates the series combination of an active voltage source and a conventional resistance, than a pure resistance, the maintenance of a constant RMS thyristor current will result in an inability to utilize the full current capacity of the thyristor. This precludes the thyristor from being used to its fullest and unduly restricts system performance. Conversely, if average current is utilized as a criterion, the thyristor temperature may in some cases exceed the permissible physical limits so that a substantial a factor of safety must be factored into the system. Again, this approach unnecessarily restricts the operation of the thyristor. It will therefore be recognized that it would be desirable to provide an improved current limit system for a pulse control system which allows the switching thyristor to be utilized to the fullest possible extent.

It is therefore an object of the present invention to provide an improved current limit system for a pulse control circuit.

It is another object of the invention to provide a current limit circuit for a pulse control system which limits the average current of a thyristor as a function of the actual mark-space ratio of the thyristor.

It is a further object to provide a current limit system which constrains maximum current as a function of both the mark-space ratio of a thyristor and thyristor temperature.

SUMMARY OF THE INVENTION

Briefly stated, in accordance with one aspect of the invention the foregoing objects are achieved by providing a first comparison stage which limits the average conductivity of a thyristor as a function of sensed load current and thyristor mark-space ratio. A current sensing element is placed in series with the load and monitors load current, producing a signal representative thereof. A second circuit applies a signal representative of the mark-space ratio of the thyristor. The signals then obtained are applied to the comparison stage and the output thereof is coupled to a control which serves to keep the maximum mark-space ratio from exceeding an appropriate value. In another embodiment of the invention, a second comparison stage is utilized to vary the signal representative of the mark-space ratio as a function of thyristor temperature. Finally, additional means may be provided for setting an ultimate limit beyond which the load current may not extend.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
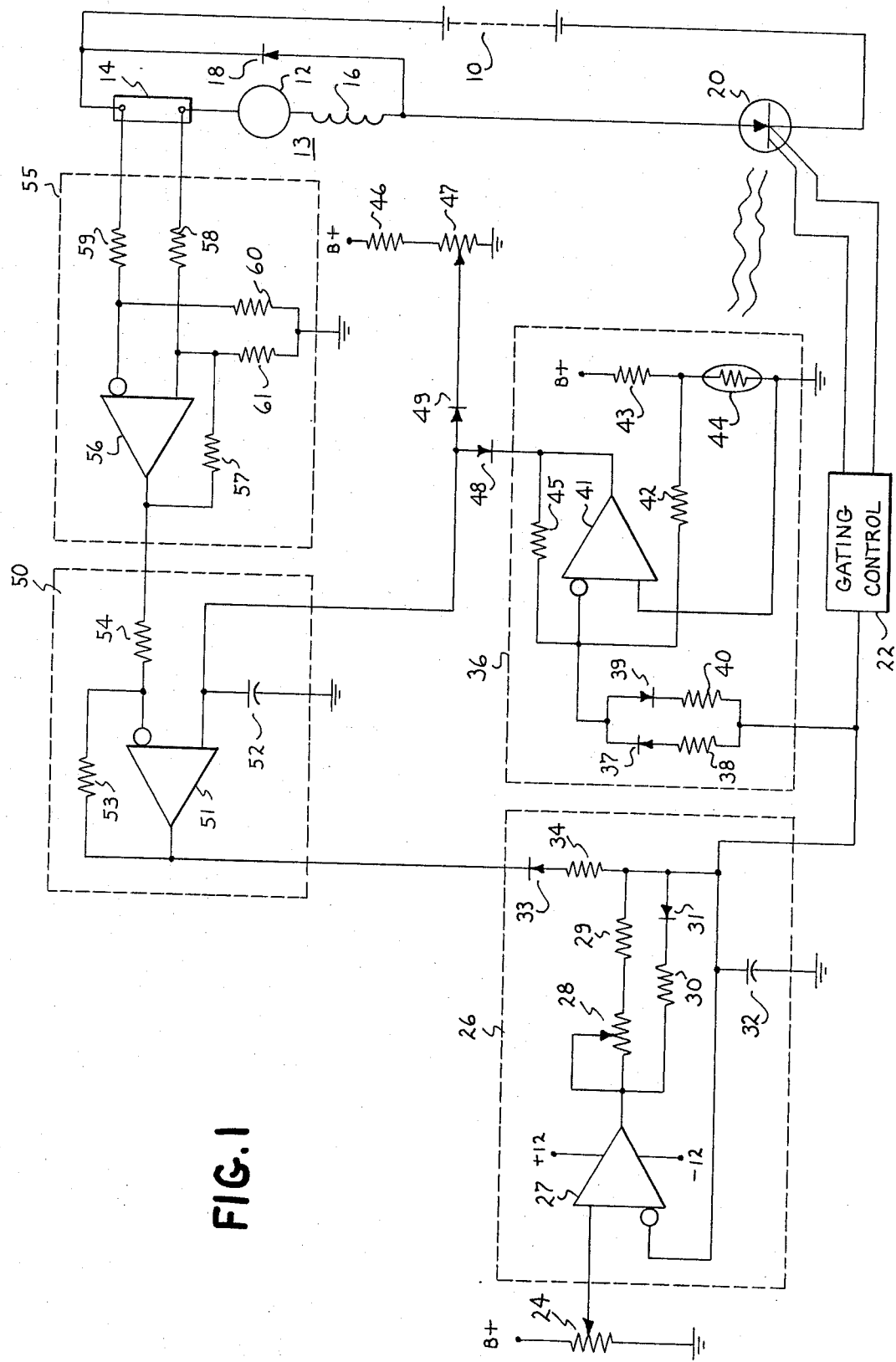
FIG. 1 is a schematic representation of the inventive system in connection with a pulse control circuit coupled to a DC motor.

FIG. 1 discloses, in schematic form, certain elements of a typical pulse control circuit adapted for use with a DC motor. A source of DC potential, here shown as battery 10, is coupled to one side of an armature 12 of a DC motor 13 by means of a resistive shunt 14. The illustrated motor is of the series-wound type and includes a field winding 16 coupled in series with the armature, and a flyback diode 18. The power circuit is completed by means of a thyristor, herein represented as SCR 20. The amount of the voltage produced by battery 10 which effectively appears across the terminals of motor 12 is a function of the average rate of conductivity, or mark-space ratio, of thyristor 20. By varying the mark-space ratio, the effective voltage across the terminals of the motor may be varied from 0 to practically 100 percent. Each time the thyristor is gated into conduction a pulse of current flows from the battery 10 through the windings of motor 13, and thyristor 20. Upon commutation of the thyristor, due to the inductive nature of the motor, current continues to flow through the motor by virtue of the presence of flyback diode 18. Current flow through the closed loop comprising the windings of motor 12 and diode 18, is thus related to, but dissimilar from, the magnitude of current flow through the overall power circuit.

In order to operate thyristor 20 at the proper intervals a gating control 22 is provided. For ease in illustration, thyristor 20 is represented as having a pair of gate leads; one for energizing, and the other commutating, the thyristor. In practice, a separate commutation circuit is commonly provided for the thyristor, and may be any one of several types. One successfully used commutation circuit is disclosed in U.S. Pat. No. 3,777,237-Anderson, issued Dec. 4, 1973 and assigned to the assignee of the present invention. Commonly, such a circuit will include a capacitor which is charged in a first direction preparatory to commutation of the thyristor. The charge upon the capacitor is then reversed and the reversed voltage thus accumulated is coupled across the terminals of thyristor 20 for back-biasing the thyristor, causing current to cease flowing therethrough and effecting the extinguishment or commutation of the thyristor. The voltage accrued across the capacitor is known to be a function of the magnitude of current flow in the power circuit. In order to limit ultimate capacitor voltage and so prevent the detrimental effects of an overvoltage condition, a current limiting circuit is sometimes provided.

The speed control 24, shown herein as a potentiometer, provides an adjustable voltage which is ultimately used to regulate the operation of gating control 22. Interposed between speed control 24 and gating control 22 is a controlled acceleration circuit 26. Controlled acceleration circuits are often provided in electric vehicle control systems in order to limit the rate of change of a control voltage applied to a gating control, in order to preclude precipitious changes in the conductivity of thyristor 20.

The controlled acceleration unit comprises a comparator 27 along with the series combination of potentiometer 28 and resistance 29, and a discharge circuit comprising a resistor 30 and diode 31. A capacitor 32 is coupled between the output terminal of the circuit and a point of reference potential serves to prevent the voltage appearing thereacross, and thus the voltage applied to thyristor control 22, from changing at an overly rapid rate. While comparator 27 may comprise any suitable comparison circuit, it has been found advantageous to use an operational amplifier of the integrated circuit variety and assigned JEDEC No. 741. Such an operational amplifier is provided with an inverting and a non-inverting input terminal and produces a signal representative of the difference between the voltages applied to input terminals. A feedback circuit comprising a diode 33 and resistor 34 couples the output terminal of the controlled acceleration circuit to a limit detector stage 50.

A limit signal stage 36 is also coupled to the output terminal of controlled acceleration module 26 by way of a pair of parallel circuits comprising a first diode 37 and resistor 38, and a second diode 39 and resistor 40, respectively. The signal traversing the diodes and their associated resistors is coupled to the inverting terminal of a comparator 41 in combination with the voltage arising across a voltage divider which comprises the series combination of a resistor 43 and a thermistor 44. Thermistor 44 is disposed in thermal communication with thyristor 20, the resistance of and thus the voltage supported by thermistor 44 reflecting the operating temperature of the thyristor. Resistor 42 connects the upper end of thermistor 44 to comparator 41, the non-inverting terminal of the comparator being coupled to a point of reference potential. Another resistor 45 is coupled about comparator 41 to provide a feedback loop.

A voltage divider comprising resistor 46 and potentiometer 47 provides a predetermined voltage which is used to determine the maximum current which the system will allow. Isolation diodes 48, 49 couple the signals outputted by current limit signal stage 36 and potentiometer 47, respectively to limit detector stage 50. The limit detector stage comprises a comparator 51 which is advantageously similar to the comparators described hereinabove. The signals outputted by current limit stage 36 and potentiometer 47 are applied by way of isolating diodes 48 and 49, respectively to the non-inverting terminal of comparator 51. This terminal is also coupled to a point of reference potential by means of a filter capacitor 52, and a resistor 53 provides a feedback signal from the output terminal of the comparator to the inverting input thereof. A signal representative of current flow through DC motor 13 is received from a current signal amplifier stage 55 by way of resistor 54.

Current signal amplifier stage 55 has applied thereto a voltage drop arising across a resistive shunt 14 coupled in series circuit relationship with motor 13. This stage comprises a comparator 56 of the type described hereinabove, having resistor 57 providing a feedback path between the output terminal of the comparator and the inverting terminal thereof. Signals are applied to the inverting terminal by way of resistor 58 and to the non-inverting terminal through resistor 59. The inverting and non-inverting terminals are coupled to a point of reference potential by means of biasing resistors 60 and 61, respectively.

In operation, the slider of speed control potentiometer 24 is raised to a position corresponding to a desired operating point. The increase is applied voltage causes comparator 27 to be driven into saturation, applying the available bias potential of 12 volts to its output terminal and thus effecting the charging of capacitor 32 in a substantially linear manner until the voltage thereof equals that of potentiometer 24. The time constant provided by capacitor 32 and resistors 28 and 29 determines the maximum rate at which the voltage applied to gating control 22 will increase, and thus provides the requisite controlled acceleration characteristic.

When the slider of potentiometer 24 is lowered, corresponding to a command for reduced motor speed, comparator 27 is driven into negative saturation. A potential of minus 12 volts appears at the output terminal and effects the discharge of capacitor 32 through resistor 30 and diode 31. In this manner the value of resistor 30 can be made substantially smaller than that of resistances 28, 29 to accelerate the rate of discharge of capacitor 32. The voltage appearing upon capacitor 32 is fed directly back to the inverting terminal of comparator 27 so that the comparator enters a quiescent state when the voltage upon capacitor 32 equals that of potentiometer 24.

In the illustrated embodiment it is considered that the control voltage applied to gating control 22 is bipolar, i.e., it commences at a negative voltage value and progressively increases to attain a maximum, positive voltage value. While this operation is characteristic of one circuit successfully tested it is not necessary to the successful operation of the circuit herein disclosed, it being recognized the gating control 22 may be adapted to operate satisfactorily in response to any appropriate applied signal.

Upon a change in the applied control signal, gating control 22 responds by varying the gating and commutation of thyristor 20 so as to adjust the mark-space ratio thereof to correspond with the applied control signal. In the present embodiment, an increase in voltage from speed control 24 effects a relatively linear increase in voltage across capacitor 32, which in turn results in a corresponding increase in the mark-space ratio of thyristor 20. This in turn increases the effective voltage applied across motor 13 and, depending upon circumstances of usage, an increase in the power supplied by the motor.

The change in the voltage level of signal applied to thyristor control 22 is also communicated through one of the diodes 37, 39 and associated resistors 38 and 40, respectively to the inverting terminal of comparator 41. In the illustrated embodiment changes in control voltage up to a level corresponding to a mark-space ratio of approximately 50 percent have a negative polarity with respect to a point of reference potential. Control signals calling for a greater than 50 percent mark-space ratio have a positive polarity. For this reason, diodes 37 and 39 are coupled in opposite directions. Resistors 38 and 40 are selected to have substantially different values, however, so that the response of comparator 41 to control signals varies according to whether such signals are above or below the 50 percent mark-space ratio.

As the voltage signal applied to the inverting terminal of comparator 41 increases, the output of the comparator decreases (increases negatively) with respect to the voltage level of the inverting terminal of limit detector comparator 51. At the same time, the inverting terminal of comparator 51 receives a signal outputted by current signal amplifier 55 which varies in response to the current flowing through motor 12. It will therefore be seen that the operation of comparator 51 is caused to vary as a function of both mark-space ratio of thyristor 20, and the sensed current flowing through motor 13. The signal outputted by comparator 51 thus increases in a negative sense with both increasing motor current and increasing mark-space ratio. Should the combination of the current signal and the mark-space ratio signal cause the signal outputted by comparator 51 to fall below the voltage of capacitor 32, diode 33 will become forward-biased and a path will be presented for the discharge of capacitor 32 by way of resistor 34. Due to the R-C time constant of the resulting discharge circuit, the change in the mark-space control signal will be damped so that oscillation of the system will be avoided.

By proper selection of circuit values, a desired interrelationship between sensed motor current and mark-space ratio may be achieved so that the voltage to which capacitor 32 is limited by limit detector stage 50 will vary as a linear function of both motor current and the mark-space ratio.

By providing a plurality of circuits between the output of control acceleration circuit 26 and comparator 41 of the current limit signal circuit, a corresponding plurality of linear relationships may be established for different mark-space control signal ranges. In the illustrated embodiment, a first linear relationship is established for negative-polarity (under 50percent) control signals by means of diode 39 and resistor 40. A second relationship, for positive control signals, is provided by diode 37 and resistor 32. By selecting a value for resistor 40 which is considerably larger than that of resistor 38, a pair of linear relationships is provided wherein the maximum allowable maximum mark-space ratio declines much more drastically with increasing current for mark-space ratios under 50percent than for those in excess of 50percent.

Figure 2:
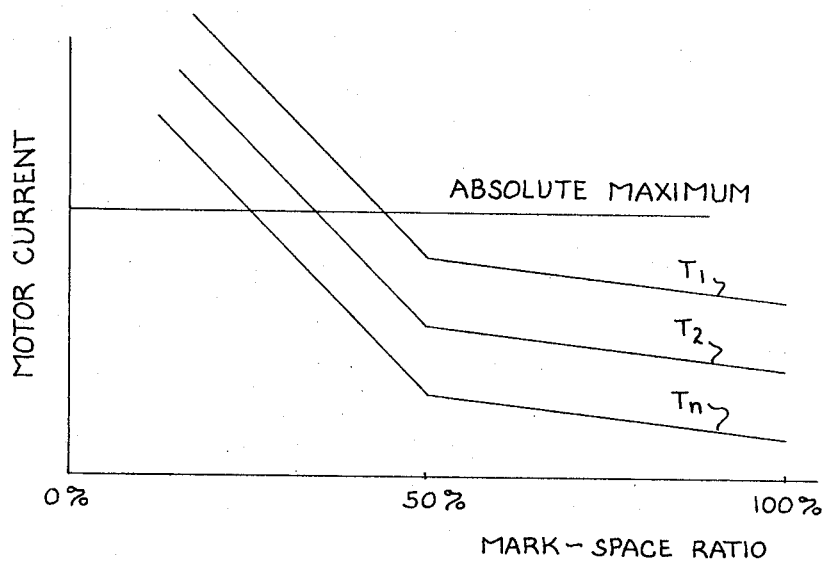
FIG. 2 is a graph illustrating the activity of the system disclosed in FIG. 1.

The foregoing relationship is more fully illustrated in FIG. 2 wherein a family of curves $T_1$----$T_n$ illustrate the linear relationships between motor current and mark-space ratio (represented as "Percent On-Time") which define the limits of operation of the switching regulation system. A curve denominated "Absolute Maximum" indicates a maximum current value which may be established to prevent damage to circuit components.

Returning to FIG. 1, a second input to the inverting terminal of comparator 41 of the current limit signal stage comprises the voltage drop arising across a thermistor 44. Thermistor 44 may be any suitable commercially-available thermistor, and preferably exhibits a characteristic resistance which increases suddenly with a rise in temperature above a predetermined value. In any event, an increase in operating temperature of thyristor 20 will effect an increased voltage across thermsitor 44, which in turn may increase the voltage applied to the inverting terminal of comparator 41. The increasingly negative signal outputted by comparator 41 through isolation diode 48 to the non-inverting terminal of comparator 51 in turn effects an increase in the negative signal produced by comparator 51. In this manner, the allowable mark-space control signal appearing across capacitor 32 is constrained to a lower value reflecting the increase in thyristor temperature. Thermistor 44 thus injects an additional factor into the system which may be considered to displace or offset the characteristic curve of FIG. 2 which reflects the permissible relationship between current and mark-space ratio. This offset is evident from FIG. 2 wherein a family of curves denominated $T_1$ through $T_n$ indicate the maximum permissible mark-space ratio for a given motor current over a range of progressively increasing thyristor temperatures.

Still another constraint upon the operation of a switching regulation system of the thyristor type is the maximum voltage which can be supported by the capacitance provided for commutation of the thyristor. For this reason, it has been found advantageous to provide an invariant, maximum current signal to the system. In the disclosed system this signal is derived from potentiometer 47. Isolation diode 49, which couples potentiometer 47 to the non-inverting input terminal of comparator 51, serves to assure that the potential appearing at the non-inverting terminal of comparator 51 will not rise above some predetermined value, i.e., the voltage established by potentiometer 47. This preset reference level assures that motor current will not exceed a predetermined maximum level, regardless of the mark-space ratio demanded by speed control 24.

Referring again to FIG. 2 it will be seen that the linear relationship established through feedback system which monitors mark-space ratio and motor current will predenominate, and serve to limit permissible motor current, for mark-space ratios which are in excess of approximately 25percent and are therefore below a predetermined absolute maximum value. It will be appreciated that, for instance, should only an invariant, absolute maximum limit be set such a limit could be no higher than the maximum current which is permissible under all conditions. Since the permissible current varies with mark-space ratio, should the fixed maximum value reflect the maximum permissible current for high mark-space ratios, the system would then prevent a high rate of current flow for low mark-space ratios although for such ratios a relatively high current flow is permissible. Similarly, should an absolute maximum be set with which reflects a current flow which is permissible for relatively low mark-space ratios, it is apparent that such a maximum would be far too high for operation during high mark-space ratios of the thyristor. Moreover, since the absolute maximum current is determined by the ability of a commutating capacitor to withstand a voltage, this characteristic being unrelated to thyristor temperature, it is preferable to establish and maintain a maximum current value which does not fluctuate with thyristor temperature.

By providing a "break" or discontinuity in the curve which represent the maximum permissible current as a function of mark-space ratio the ultimate current-carrying ability of the thyristor is almost completely utilized. Although the slopes of the intersecting lines which comprise the curves may be varied for any particular application, it has been found that a combination of two such linear curves closely approximate the calculated maximum current capability for most commercial thyristors. In particular, it has been found through mathematical analysis that the current-carrying capabilities of a thyristor, for a given temperature, can be closely approximated by relating maximum motor current as a function of mark-space ratio with two linear curves intersecting at approximately the 50percent mark-space ratio. The indicated translation of the curve as a function of temperature maintains the maximum permissible current in the presence of changes in thyristor temperature.

It will be seen that there has been described herein an improved current limit system which provides a composite current limit, taking into account both motor current flow and percent on-time of the switching regulation thyristor in order to produce a current limit characteristic which closely approximates the calculated maximum current-carrying capabilities of the thyristor. In addition, means are provided for translating the aforementioned curves without changing a predetermined, absolute limit for current flow which absolute limit reflects the limitations of portions of the circuit separate from the thyristor itself.

As will be evidenced from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not part from the true spirit of scope of the invention.

What is claimed as new and desired to be secured by Letters Patent of the United States:

1. A current limiting system for a pulse controller including solid-state switching means for metering power from a DC source to a DC load comprising:
   means for sensing load current and outputting a signal representative thereof;
   a gating control for controlling the mark-space ratio of the solid-state switching means as a function of an applied control signal;
   a power control circuit for applying a control signal representative of a desired mark-space ratio to said gating control;
   a current limit signal stage for producing a current limiting signal which varies as a function of mark-space ratio;
   means coupling said power control circuit to said current limit signal stage; and
   a current limit detector for receiving signals from said load current sensing means and said current limit signal stage, and for outputting a signal to said power control circuit to regulate the operation thereof.

2. The invention defined in claim 1, further including temperature sensing means disposed in thermal relationship to said solid-state switching means and coupled to said current limit signal stage for varying the output thereof in response to changes in the temperature of said solid state switching means.

3. The invention defined in claim 2, further including a maximum limit signal circuit for producing a second current limit signal representative of a maximum allowable current, and means coupling said second current limit signal to said current limit detector.

4. The invention defined in claim 3, wherein said current limit signal stage produces output signals having a first relationship to control signals in a first range and a second relationship to control signals in a second range.

5. A system for limiting current flowing to a DC load through a pulse control system including a thyristor comprising:
   current sensing means coupled in circuit with said DC load for producing a signal representative of load current;
   oscillator means for controlling the mark-space ratio of the thyristor as a predetermined function of an applied control signal;
   a power control circuit for applying a control signal to said oscillator means;
   a current limit signal circuit coupled to said power control circuit for producing a pilot limiting signal which varies as a function of mark-space ratio;
   limit detector means coupled to said current limit signal circuit and to said current sensing means and operative to produce a limit signal in response to the signals received therefrom; and circuit means for applying the limit signal produced by said limit detector means to said oscillator means.

6. The invention defined in claim 5, further including thermal sensing means disposed in heat conducting relationship to said thyristor and operative to produce a signal representative of the temperature thereof; and means for coupling said signal to said current limit signal circuit to cause said pilot limiting signal to vary as a partial function of thyristor temperature.

7. The invention defined in claim 6, further including a second current limit signal circuit for producing a signal representative of a maximum allowable current, and means coupling said second current limit signal circuit to said limit detector means.

8. The invention defined in claim 7, wherein said pilot limiting signal varies at a first rate for mark-space ratio below a predetermined value and at a second, lesser rate for mark-space ratios above said predetermined value.

9. The invention defined in claim 5, further including a second current limit signal circuit for producing a signal representative of a maximum allowable current, and means coupling said second current limit signal circuit to said limit detector means.

10. A circuit for limiting current flow in a pulse control system of the type which varies the mark-space ratio of a thyristor for metering power from a DC source to a DC load comprising:

speed control means for producing a speed control signal;

a controlled acceleration circuit responsive to said speed control signal to produce a control signal representative of a desired mark-space ratio;

a gating control responsive to said control signal for repeatedly energizing and commutating the thyristor;

a thermal sensor for producing a signal representative of thyristor temperature;

a limit signal circuit coupled to said controlled acceleration circuit and to said thermal sensor for outputting a limit signal which varies with thyristor temperature and further varies in a first manner with control signals representing mark-space ratios beneath a predetermined value and in a second manner with control signals representing mark-space ratios above said predetermined value;

current sensing means for outputting a signal representative of current flow through the load;

adjustable limit means for producing an invariant signal representative of a maximum allowable load current;

a limit detector circuit comprising comparator means having one input terminal coupled to said current sensing means and another terminal coupled to said limit signal circuit and said adjustable limit means; and circuit means coupling the output of said limit detector to said controlled acceleration circuit whereby said control signal may be limited for maintaining load current within predetermined limits.

* * * * *